(No Model.) 2 Sheets—Sheet 1.

J. McCREARY & D. R. SMITH.
MACHINE FOR RADIAL CRIMPING.

No. 285,424. Patented Sept. 25, 1883.

WITNESSES
INVENTOR
John McCreary
David R. Smith
by A. M. Smith
Attorney.

(No Model.) 2 Sheets—Sheet 2.

J. McCREARY & D. R. SMITH.
MACHINE FOR RADIAL CRIMPING.

No. 285,424. Patented Sept. 25, 1883.

WITNESSES
F. L. Ourand
Rex. Smith

INVENTOR
John McCreary
David R. Smith
by All Smith
Attorney

UNITED STATES PATENT OFFICE.

JOHN McCREARY, OF COHOES, AND DAVID R. SMITH, OF TROY, NEW YORK, ASSIGNORS OF ONE-HALF TO GEORGE H. BILLINGS AND EZRA W. CARTER, BOTH OF COHOES, NEW YORK.

MACHINE FOR RADIAL CRIMPING.

SPECIFICATION forming part of Letters Patent No. 285,424, dated September 25, 1883.

Application filed December 26, 1882. (No model.)

*To all whom it may concern:*

Be it known that we, JOHN McCREARY, of Cohoes, county of Albany, State of New York, and DAVID R. SMITH, of Troy, county of Rensselaer, State of New York, have invented new and useful Improvements in Methods of and Machines for Radial Crimping, of which the following is a full, clear, and exact description, reference being had to the accompanying drawings, making part of this specification.

Our invention consists in the combination, in a machine for producing radial crimping, suitable for filtering-paper and for pharmaceutical purposes, of cones provided with intermeshing teeth having suitable edges and intervening grooves, adapted to form radial crimps, folds, or fold-marks in the material operated upon, and means for imparting to said intermeshing cones a varying relative velocity for a purpose and in a manner substantially as hereinafter explained.

Figure 1:
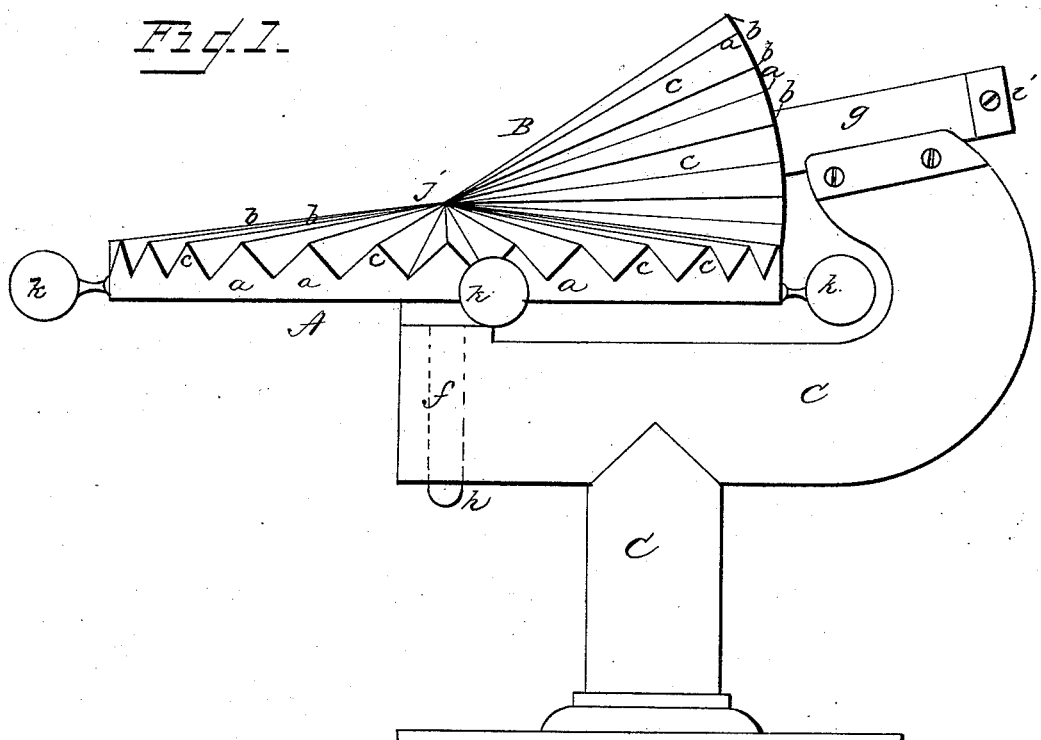
Figure 2:
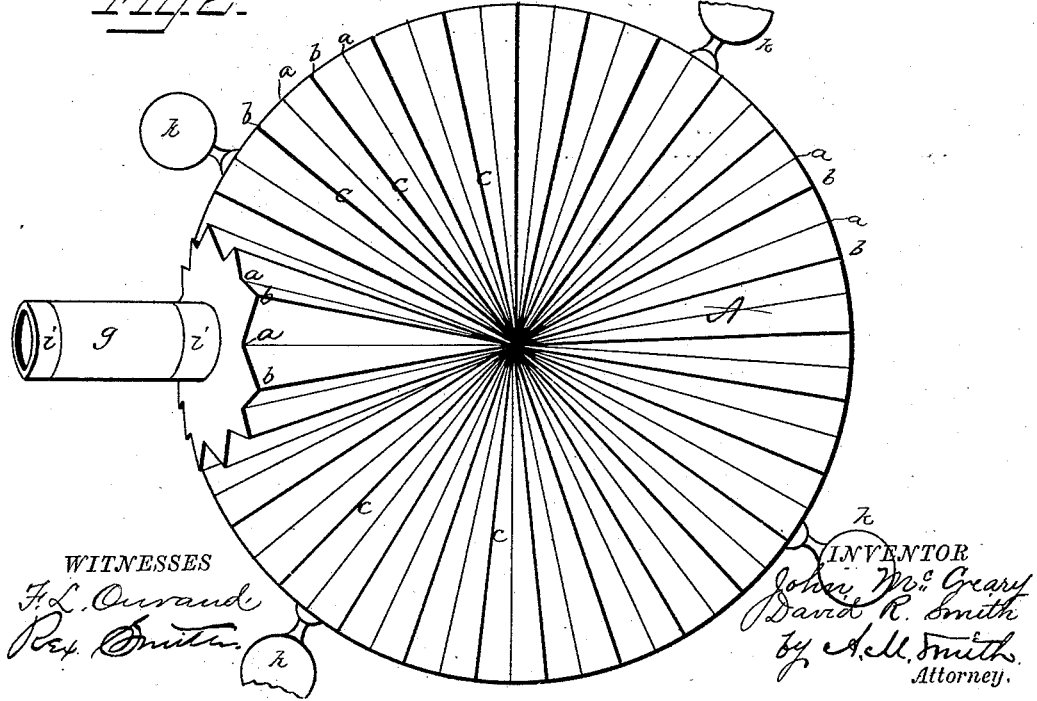
Figure 3:
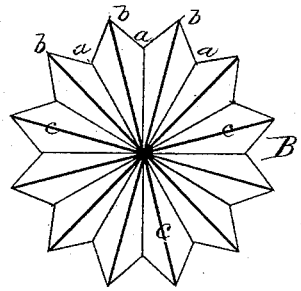
Figure 4:
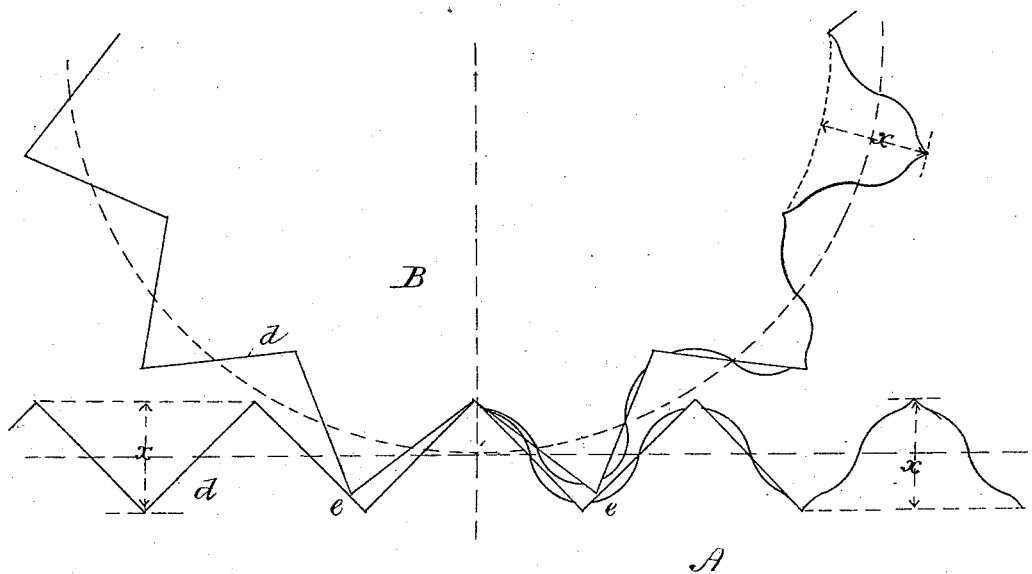

In the accompanying drawings, Figure 1 is a side elevation of a machine embodying our invention. Fig. 2 is a plan view of the same. Fig. 3 is an end view of the driven cone, and Fig. 4 is a diagram illustrating the development of the grooves and edges.

A and B are the revolving cones, each having teeth radiating from the apex, the apex of one cone coinciding with the apex of the other, the axles of each cone having suitable journals with bearings in a supporting-frame, the whole so constructed and arranged that the teeth interlock and the cones revolve in a manner similar to but not identical with bevel or other toothed conical gearing.

In the drawings, $a$ are the grooves, and $b$ are the edges. In Figs. 1 and 2 the teeth $c$ are formed with plane flanks corresponding to the straight lines $d$ in Fig. 4; but with teeth so formed the edges $b$ would rub and compress the paper or material against the flanks $e$ of the teeth. Therefore suitable curved flanks are necessary. The development of such suitable curved flanks is clearly shown in the diagram, Fig. 4.

In the machine shown in the drawings, A represents a flattened driving-cone, and B the driven cone; but evidently either cone may be made to drive the other; and it is also evident that, instead of one of the cones A or B driving the other, both may be driven by means of suitable gearing, in which latter case the form of the flanks of the teeth would be unimportant, except in that they should be so formed as not to rub or compress the paper injuriously; but the driving-gearing, to be suitable, must impart to the cones the same varying relative velocity that would result from having the cones provided with the teeth formed as described and driving one from the other.

In ordinary gearing the teeth are so constructed or formed that the driving and driven cones have always an equal angular velocity one to the other; but in our invention, when one of the cones A or B drives the other, the teeth are so formed that the grooves and edges of the driving-cone alternate with each other in driving, and consequently the relative speed of the cones each to each varies as varies the distance of the line of contact of the driving edge or groove from the axis of the driven cone. Each cone in turn moves fastest relatively when one of its grooves is passing between the axes, and slowest relatively when one of its edges is so passing. The teeth of ordinary gearing terminate in flat or rounded "faces" instead of "edges," and have flat or rounded grooves between the flanks of adjacent teeth. Sheets of metal, or even stout paper, may be crimped between the teeth of any ordinary gearing; but the crimps thereby formed would not be suitable for filtering-paper.

We have used and have at this time in our possession a machine embodying our invention, very similar in general appearance to that represented in Figs. 1 and 3 of R. B. Hugunin's Patent No. 42,377, April 19, 1864; but for the purpose of our invention the cones must have the grooves and edges herein described, and shown in the drawings, and the teeth must either have the rounded flanks shown in Fig. 4 of our drawings, or the toothed drivingwheels must have their teeth formed as shown in said diagram, in order to give the necessary changing relative velocity to the revolving cones to prevent injurious rubbing or abrasion of the material acted upon.

In the drawings, C is a suitable stand or frame, having suitable bearings or boxes, $f$ and $g$, to receive and carry the axles $h$ and $i$ of the driving-cone A and the driven cone B, respectively. $j$ is the common apex or point from which the several teeth $c$ diverge or radiate. $k$ are suitable handles or knobs projecting from the driving-cone A.

If a sheet of filtering-paper folded through the center on one diagonal, if the sheet is square, or on one diameter, if the sheet is circular, be placed upon the face of the driving-cone A, with the center of the paper at the point $j$, and if the cone A be then caused to revolve by the action of the hand of the operator on a knob or knobs, $k$, or otherwise, the cone B will be driven by the cone A and the paper carried in and passed through between the two cones, and by the pressure of the edges $b$ in the grooves $a$ will be crimped, marked, or folded in the manner required in manufacturing radially-crimped filtering-paper.

By so constructing the machine that provision is made for slightly separating the two cones the paper might be inserted between them without having been previously folded through the center, having the center of the sheet coincide with the point $j$, thereby closing the cones on the intervening paper and causing them to revolve, the filtering-paper would be properly marked or folded; but for simplicity of construction and rapidity of operation we prefer not to provide for separating the cones to receive the paper and to fold the paper as specified before passing it between the cones.

Having now described our invention, what we claim as new is—

1. In a machine for radially crimping filtering-paper, revolving cones having a variable relative velocity, and provided with intermeshing teeth having suitable edges and corresponding intervening grooves, adapted to form radial crimps, folds, or fold-marks in said material in its passage between said cones, substantially as described.

2. In a machine for producing radial crimping, the cones A and B, provided with intermeshing knife-edged teeth and correspondingly-shaped intervening grooves of a form adapted to impart a variable relative velocity to the cones and to produce radial or diverging fold-marks or crimps in filtering-paper, for the purpose and substantially in the manner described.

3. The combination, in a machine for producing radial crimping, of the cones A and B, provided with intermeshing knife-edged teeth and correspondingly-shaped intervening grooves, adapted to impart a variable relative velocity to the cones, and to form radial fold-marks or crimps in filtering-paper, and means, substantially as described, for actuating said cones, substantially as described.

In testimony whereof we have hereunto set our hands this 14th day of December, A. D. 1882.

JOHN McCREARY.
DAVID R. SMITH.

Witnesses:
CHAS. O. EVEAN,
SAML. H. EDGERLY.